United States Patent
Miyoshi

(10) Patent No.: US 12,437,660 B2
(45) Date of Patent: Oct. 7, 2025

(54) UNMANNED AIRCRAFT CONTROLLER, AND STORAGE MEDIUM

(71) Applicant: FANUC CORPORATION, Yamanashi (JP)

(72) Inventor: Takashi Miyoshi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 203 days.

(21) Appl. No.: 18/252,040

(22) PCT Filed: Nov. 16, 2021

(86) PCT No.: PCT/JP2021/042064
§ 371 (c)(1),
(2) Date: May 8, 2023

(87) PCT Pub. No.: WO2022/107758
PCT Pub. Date: May 27, 2022

(65) Prior Publication Data
US 2024/0013664 A1  Jan. 11, 2024

(30) Foreign Application Priority Data
Nov. 20, 2020  (JP) ................................. 2020-193374

(51) Int. Cl.
*G08G 5/55* (2025.01)
*G05D 1/00* (2024.01)
(Continued)

(52) U.S. Cl.
CPC ............ *G08G 5/55* (2025.01); *G05D 1/101* (2013.01); *G08G 5/32* (2025.01); *G08G 5/57* (2025.01);
(Continued)

(58) Field of Classification Search
CPC ............ B64U 10/13; B64U 2201/10; H10D 84/0126; G05D 2107/70; G05D 2109/254;
(Continued)

(56) References Cited

FOREIGN PATENT DOCUMENTS

| CN | 111580545 A | * | 8/2020 | ............. G05D 1/101 |
| JP | H06-28019 A | | 2/1994 | |

(Continued)

OTHER PUBLICATIONS

Reinhardt, D., Saunders, R., & Burry, J. (Eds.). (2016). Robotic fabrication in architecture, art and design 2016. Cham: Springer. (Year: 2016).*

(Continued)

*Primary Examiner* — Hitesh Patel
*Assistant Examiner* — Tabitha Kress
(74) *Attorney, Agent, or Firm* — HAUPTMAN HAM, LLP

(57) ABSTRACT

An available work storage unit stores machinery/equipment on which an unmanned aircraft is to carry out work, and work content which can be carried out on the machinery/equipment. A work content acquisition unit acquires machinery/equipment on which work is to be carried out and work content to be carried out by the unmanned aircraft. A flight plan creation unit determines identification information regarding the machinery/equipment acquired by the work content acquisition unit and a work location for the unmanned aircraft on the basis of the work content, and creates a flight plan for carrying out work at the determined work location.

12 Claims, 11 Drawing Sheets

(51) Int. Cl.
    *G08G 5/32*          (2025.01)
    *G08G 5/57*          (2025.01)
    *B64U 10/13*         (2023.01)
    *B64U 101/26*       (2023.01)
    *B64U 101/30*       (2023.01)
    *B64U 101/70*       (2023.01)

(52) U.S. Cl.
    CPC .......... *B64U 10/13* (2023.01); *B64U 2101/26* (2023.01); *B64U 2101/30* (2023.01); *B64U 2101/70* (2023.01); *B64U 2201/10* (2023.01)

(58) Field of Classification Search
    CPC . G05D 2111/32; H10H 29/922; G05B 19/418
    See application file for complete search history.

(56) References Cited

FOREIGN PATENT DOCUMENTS

| | | | |
|---|---|---|---|
| JP | 2020-142326 A | | 9/2020 |
| JP | 2020166352 A | * | 10/2020 |

OTHER PUBLICATIONS

International Search Report in PCT/JP2021/042064, mailed Feb. 1, 2022, 4pp.

\* cited by examiner

UNMANNED AIRCRAFT CONTROLLER, AND STORAGE MEDIUM

RELATED APPLICATIONS

The present application is a National Phase of International Application No. PCT/JP2021/042064 filed Nov. 16, 2021, which claims priority to Japanese Application No. 2020-193374 filed Nov. 20, 2020.

TECHNICAL FIELD

The present invention relates to an unmanned aircraft operated in a factory, and a computer-readable storage medium.

BACKGROUND ART

Patent Literature 1 discloses a robot system that includes a robot, a robot controller for controlling the robot, a teaching device for sending a teaching signal for the robot to the robot controller in response to an input of teaching made by an operator, an unmanned aircraft having an imaging device, and a flight control unit for controlling the flight of the unmanned aircraft such that the imaging device can continuously take images of an object necessary for teaching based on the teaching signal during the operation of the robot according to the teaching signal.

In general, robots are sometimes used within fences on a manufacturing floor with consideration for safety. According to Patent Literature 1, the flight of the unmanned aircraft is controlled based on the teaching signal for controlling the robot during the operation of the robot, so that the operator can perform teaching on the robot even in an environment where it is difficult to see the movement of the robot directly from outside the fences.

There have conventionally been an increasing number of cases of using unmanned aircrafts (drones) for inventory management in warehouses, and monitoring the status of factories and so on. These unmanned aircrafts are flying objects and have flexible movement areas, and thus are expected to be used in new ways.

PRIOR ART DOCUMENT

Patent Literature

[Patent Literature 1] Japanese Patent Laid-Open Publication No. 2020-142326

SUMMARY OF THE INVENTION

Problems to be Solved by the Invention

Technology that utilizes unmanned aircrafts is desired in manufacturing floors.

Means for Solving the Problem

One aspect of the present disclosure is an unmanned aircraft controller that is designed for an unmanned aircraft to be operated in a factory, and includes an available task storage unit that stores identification information on machines and task descriptions that can be conducted on the machines by the unmanned aircraft, a task description acquisition unit that acquires identification information on machines that are objects of tasks conducted by the unmanned aircraft and task descriptions to be conducted on the machines by the unmanned aircraft, a flight plan creation unit that creates a flight plan for the unmanned aircraft based on the identification information on the machines acquired by the task description acquisition unit and the task descriptions to be conducted on the machines by the unmanned aircraft, and a flight plant output unit that outputs a flight plan to the unmanned aircraft.

One aspect of the present disclosure is a storage medium that is configured to store computer-readable commands that are executed by one or more processors to store identification information on machines and task descriptions that are conducted by an unmanned aircraft on the machines, acquire the identification information on the machines that are objects of tasks conducted by an unmanned aircraft and task descriptions to be conducted on the machines by the unmanned aircraft, and create a flight plan for the unmanned aircraft based on the acquired identification information on the machines and the task descriptions to be conducted on the machines by the unmanned aircraft.

Effect of the Invention

In accordance with the aspect of the invention, an unmanned aircraft can be utilized.

MODE FOR CARRYING THE INVENTION

First Disclosure

Figure 1:
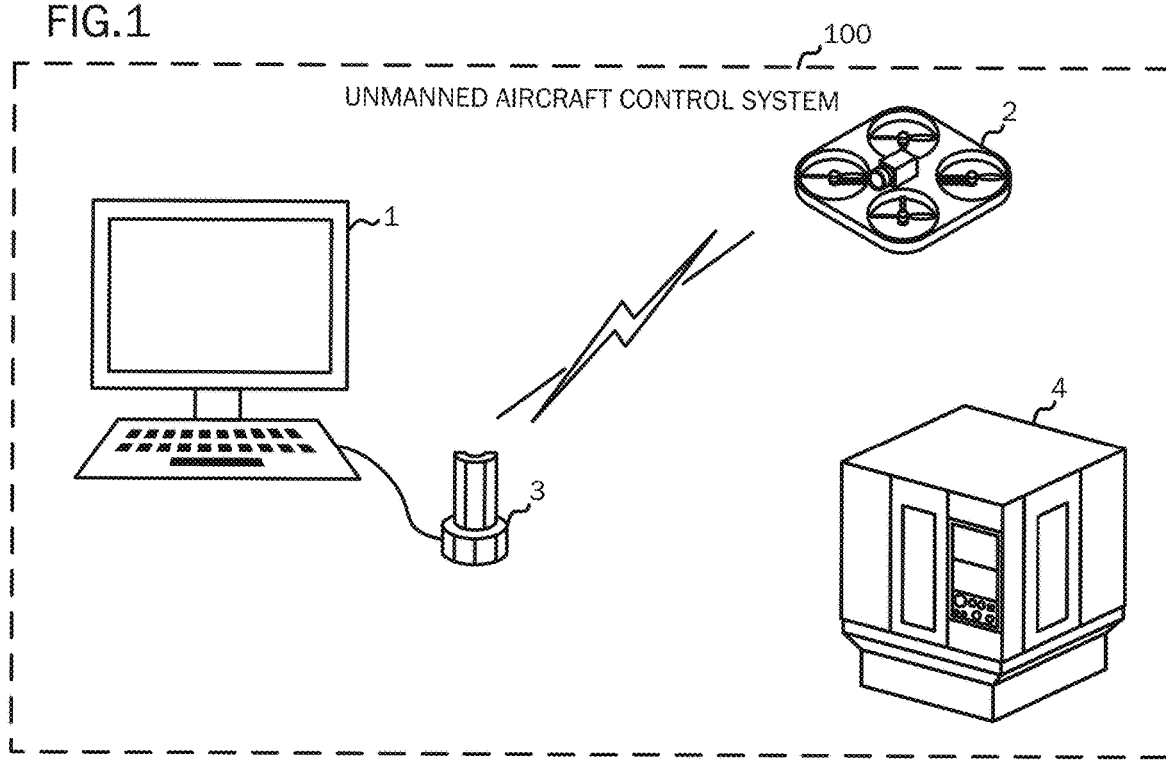
FIG. 1 is a conceptual diagram of an unmanned aircraft control system.

FIG. 1 is a conceptual diagram of an unmanned aircraft control system 100.

The unmanned aircraft control system 100 includes one or more unmanned aircrafts 2, a personal computer (PC) 1 that creates control information on the unmanned aircraft 2, and a radio communication device 3 that mediates communication between the unmanned aircraft 2 and the PC 1.

The unmanned aircraft control system 100 is installed in a space in a factory, for instance, where multiple machines 4 are arranged. The unmanned aircraft 2 moves around a factory to carry out tasks according to control information provided from the PC 1.

A device for creating control information for controlling an unmanned aircraft may be an information processing device other than the PC 1, e.g., a server, mobile terminal or numerical controller.

Figure 2:
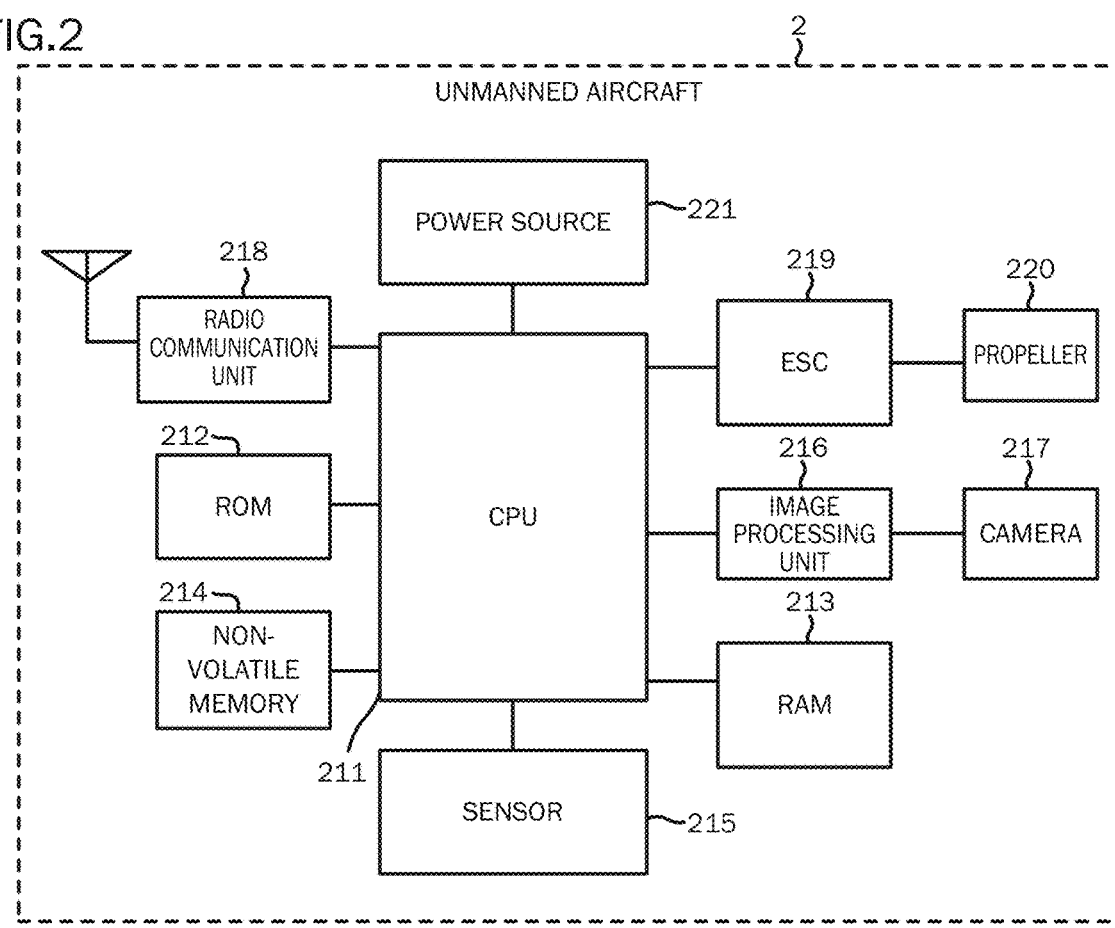
FIG. 2 is a hardware configuration diagram of an unmanned aircraft.

The unmanned aircraft 2 has a hardware configuration shown in FIG. 2. The unmanned aircraft 2 includes a central processing unit (CPU) 211 that is a processor for controlling the overall unmanned aircraft 2. The CPU 211 is configured to read a system program stored in a read-only memory (ROM) 212 via a bus to thereby control the overall unmanned aircraft 2 in accordance with the system program. A random-access memory (RAM) 213 is configured to temporarily store temporary computation data and various pieces of data input by an external device, for instance.

A non-volatile memory 214 consists of a memory which is backed up by a battery, not shown, by way of example. In the non-volatile memory 214, a state of storage of data written therein is retained even when a power source 221 of the unmanned aircraft 2 is turned off. The non-volatile memory 214 is configured to store, for example, pieces of data read from an external device, not shown, and pieces of data obtained from a communication device via a network. The pieces of data stored in the non-volatile memory 214 may be deployed into the RAM 213 when executing/using the unmanned aircraft 2. Furthermore, the ROM 212 is configured to record beforehand various system programs, such as known programs.

A sensor 215 is an accelerometer, an angular velocity sensor, an electronic compass, a pressure sensor or a distance sensor. The electronic compass is for obtaining a direction of the unmanned aircraft by magnetic force. The distance sensor is a light detection and ranging (LIDAR) sensor, for instance, that measures scattering light for pulsed laser irradiation.

The CPU 211 mounted on the unmanned aircraft 2 serves as a flight controller or a controller companion, for instance. The CPU 211 does not have to be one, and a plurality of CPUs 211 may be mounted according to their functions. The CPU 211 serving as a flight controller is configured to adjust the attitude of the airframe of the aircraft to its appropriate position based on information acquired from a sensor. The CPU 211 determines tilt and movement of the unmanned aircraft 2 based on an amount of speed variation of the unmanned aircraft 2 acquired by an accelerometer, determines changes in the tilt and direction of the unmanned aircraft 2 based on an amount of change in a rotational speed of the unmanned aircraft 2 acquired from an angular velocity sensor, and determines the altitude of the unmanned aircraft 2 based on air pressure acquired from a pressure sensor.

The CPU 211 serving as a controller companion is configured to also determine two-dimensional or three-dimensional point group data based on a value of scattering light acquired by a LIDAR sensor. The point group data will be an environmental map around the unmanned aircraft 2. In addition to that, the CPU 211 can perform successive estimation of a movement amount of the unmanned aircraft 2 by matching point groups to one another. The movement amount is added up so that a self-location can be estimated. Furthermore, in order to use the LIDAR sensor for the estimation of the self-location of the unmanned aircraft 2, values acquired from the accelerometer and the angular velocity sensor may be combined.

Instead of the LIDAR sensor, an infrared sensor, ultrasonic sensor or radar sensor with radio waves may be used as a distance sensor. A camera or image sensor can also be used as a distance sensor, in place of the LIDAR sensor. In a case of using a camera, an AR marker, AR tag, QR code (registered trademark) or similar can be used in combination with the camera. As an example of using no distance sensors, there is a method for estimating the self-location by using beacons. The present disclosure does not particularly limit a method for estimating the self-location of the unmanned aircraft 2.

An image processing unit 216 is configured to convert images taken by a camera 217 into appropriate data and output the data to the CPU 211. The camera 217 of the unmanned aircraft 2 mainly takes pictures of a machine/machines 4 selected by a user. This allows the user to grasp the state of a factory, such as values of instruments and an operating condition of the machine 4.

A radio communication unit 218 is configured to send and receive pieces of data to and from the PC 1 via the radio communication device 3. The PC 1 sends a command to the unmanned aircraft 2. The command includes a flight plan of the unmanned aircraft 2. The unmanned aircraft 2 conducts a task according to the flight plan provided by the PC 1.

An electric speed controller (ESC) 219 is also called an amplifier and is attached to each propeller. The ESC 219 controls the revolutions per minute (RPM) of a motor according to instructions from the CPU 211. The control is conducted on the RPMs of propellers 220 to cause a difference in air pressure above and below the propellers, and the difference in the air pressure provides a lift that enables the unmanned aircraft 2 to fly. Lift is upward force that pushes up the unmanned aircraft 2. The speed and the direction of travel of the unmanned aircraft 2 can be changed by varying the RPMs of the propellers 220.

The control of the RPMs of the propellers 220 allows the unmanned aircraft 2 to hover (the lift and the force of gravity are equivalent), ascend (increase in the RPMs of four motors), descend (decrease in the RPMs of the four motors), move back and forth and left to right (the increase in the RPMs of two propellers opposite to the direction of travel moves the unmanned aircraft in the direction of travel), turn counterclockwise (increase in the RPMs of right-hand propellers), turn clockwise (increase in the RPMs of left-hand propellers) and so on.

Figure 3:
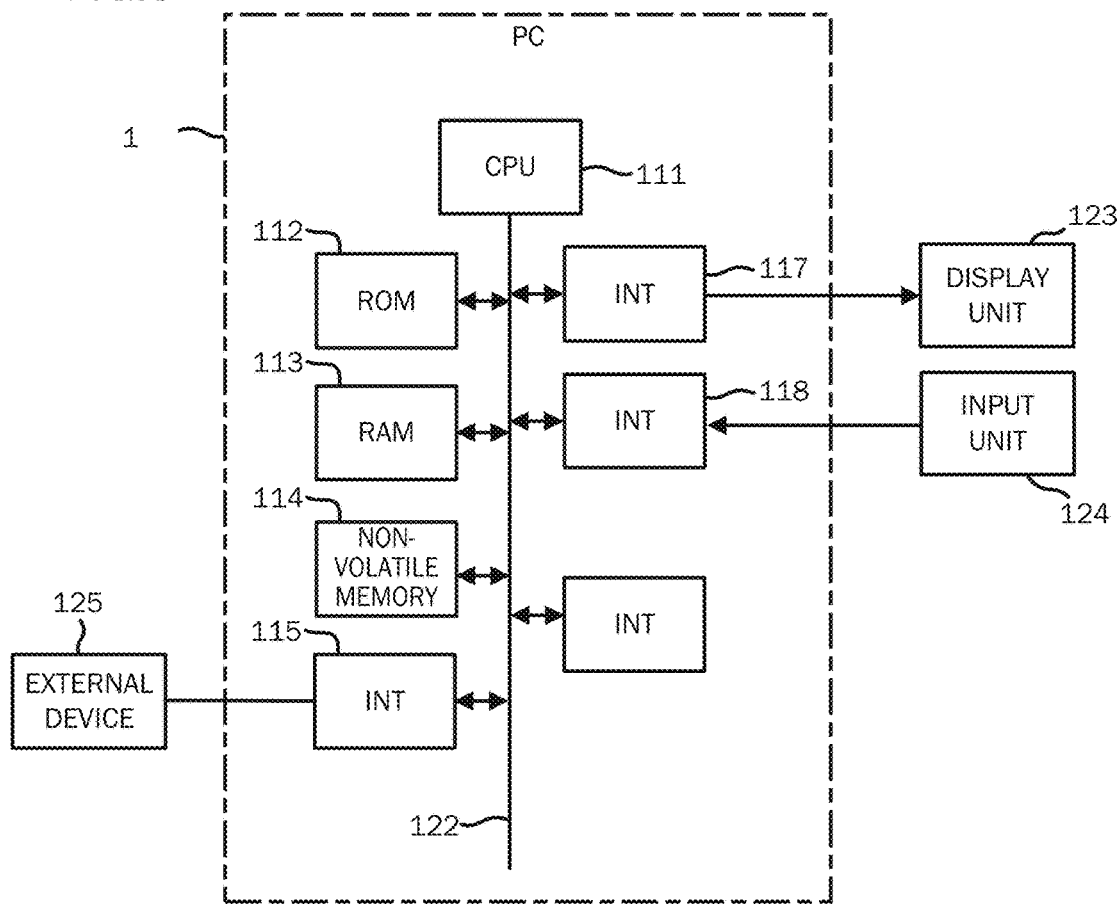
FIG. 3 is a hardware configuration diagram of a PC.

The PC 1 has a hardware configuration shown in FIG. 3.

A CPU 111 included in the PC 1 is a processor configured to control the overall PC 1. The CPU 111 reads a system program stored in a ROM 112 via a bus 122 to thereby control the overall PC 1 according to the system program. A RAM 113 is configured to temporarily store temporary computation data and display data, various pieces of data input by an external device and others.

A non-volatile memory 114 consists of a memory or a solid state device (SSD) which is backed up by a battery, not shown, by way of example. In the non-volatile memory 114, a state of storage of data written therein is retained even when a power source of the PC 1 is turned off. The non-volatile memory 114 is configured to store, for example, pieces of data read from an external device 125 via an interface 115, pieces of data input through an input unit 124, and pieces of data acquired from the unmanned aircraft via a radio communication device. The pieces of data stored in the non-volatile memory 114 may be deployed into the RAM 113 when executed/used. Furthermore, the ROM 112 is configured to record beforehand various system programs, such as known program and others.

A display unit 123 is configured to output and display pieces of data or similar which are obtained by executing the pieces of data, programs and others read in the memory via an interface 117. In addition to that, the input unit 124 that consists of a keyboard, a pointing device and others is configured to pass data and others input by a programmer via an interface 118 to the CPU 111.

Figure 4:
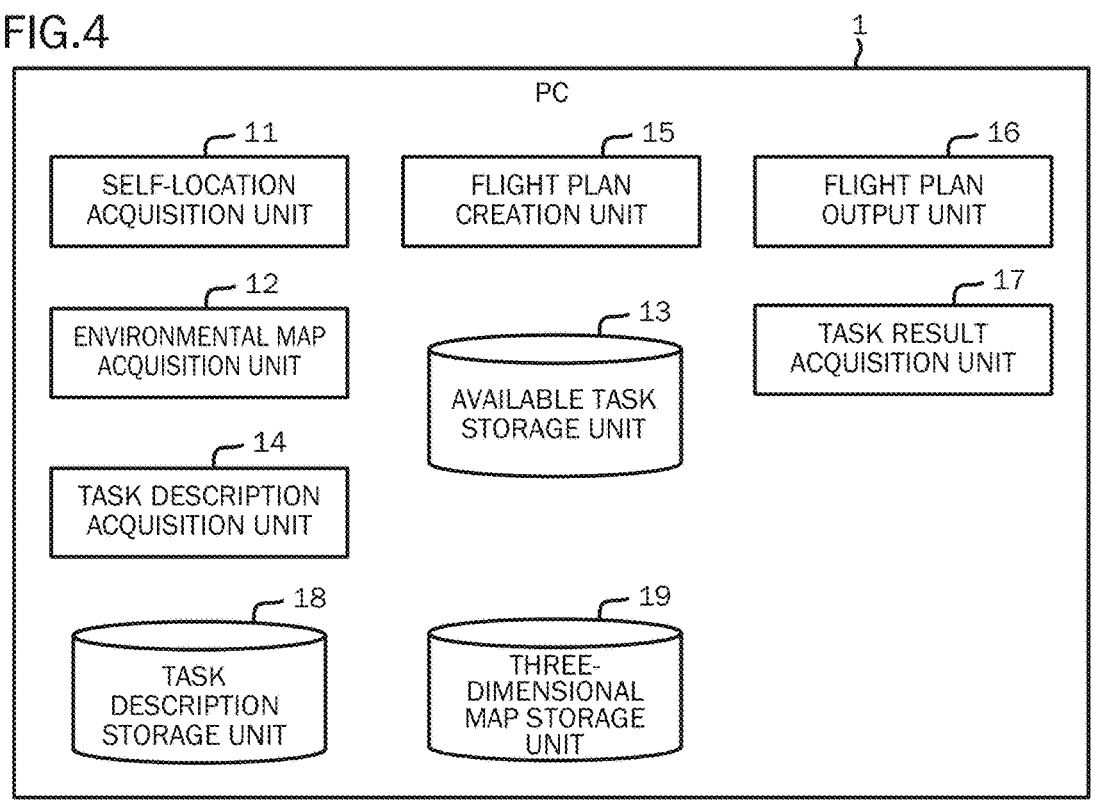
FIG. 4 is a block diagram of a PC according to a first disclosure.

FIG. 4 is a block diagram of the PC 1. The PC 1 has a self-location acquisition unit 11, an environmental map acquisition unit 12 that acquires an environmental map of the unmanned aircraft 2, an available task storage unit 13 that stores task descriptions which can be conducted by the unmanned aircraft 2, a task description acquisition unit 14 that acquires a task description/descriptions to be conducted by the unmanned aircraft 2, a flight plan creation unit 15 that creates a flight plan to implement tasks, a flight plan output unit 16 that outputs a flight plan to the unmanned aircraft 2, and a task result acquisition unit 17 that acquires a result of a task conducted by the unmanned aircraft 2.

The self-location acquisition unit 11 is configured to acquire a self-location of the unmanned aircraft 2 through the radio communication device 3. The self-location of the unmanned aircraft 2 is a location of the unmanned aircraft 2 determined by the unmanned aircraft 2 based on values obtained from the accelerometer, the angular velocity sensor and the distance sensor. In a case of providing a base 5 for holding the unmanned aircraft 2 during stand-by (see FIG. 8), the coordinates of the unmanned aircraft 2 can be determined from the location of the base 5.

The environmental map acquisition unit 12 is configured to acquire an environmental map of the unmanned aircraft 2 through the radio communication device 3. Environmental map means point group data around the unmanned aircraft 2. An environmental map is created based on the values obtained from the distance sensor, for instance. The self-location of the unmanned aircraft 2 can be also estimated by using radio waves of beacons, Wi-Fi or similar. In a case of utilizing intensity of radio waves of beacons or Wi-Fi, an environmental map is not necessarily created because the coordinates of the unmanned aircraft 2 can be tracked. In a case where an environmental map is created, information about the surroundings of the unmanned aircraft 2 can be acquired in real time to detect unexpected obstacles.

The available task storage unit 13 is configured to store the identification information on the machines 4 on which the unmanned aircraft 2 conducts tasks and task descriptions executable on the machines 4. The machines 4 have different shapes and functions depending on their types and manufacturers. In addition to that, task locations (locations and directions where the unmanned aircraft 2 conducts tasks) and task descriptions of the unmanned aircraft 2 differ according to the machines 4. The available task storage unit 13 stores the task description of the unmanned aircraft 2 for each machine 4.

Figure 5:
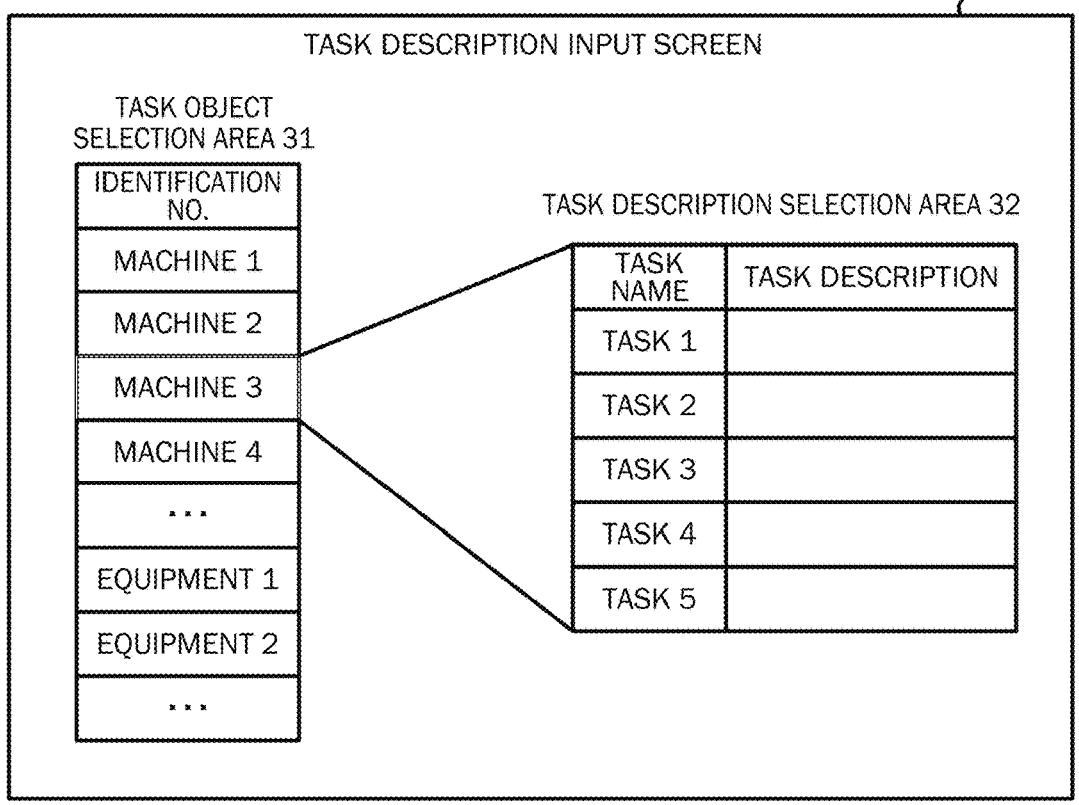
FIG. 5 shows an example of an input screen presenting task descriptions.

The task description acquisition unit 14 is configured to acquire and store the identification information on the machines 4 which are task objects and task descriptions to be conducted by the unmanned aircraft 2 in a task description storage unit 18. The task descriptions to be conducted by the unmanned aircraft 2 is principally selected by a user. FIG. 5 shows an example of a task description input screen 30. The task description input screen 30 in FIG. 5 has a task object selection area 31 for selecting a machine 4 which is a task object and a task description selection area 32 for selecting a task description. The task object selection area 31 allows the user to select an "identification number" that is identification information for identifying the machine 4. When the "identification number" of the machine 4 is selected, the task description selection area 32 is displayed. The task description selection area 32 allows the user to select a "task description". Each of "task descriptions" shown in FIG. 5 is given a "task name".

In the case where there is no desired task description, the user may create a new task description. When creating a task description, computer aided design (CAD) software or others is used to specify a task location, and a task description which can be conducted by the unmanned aircraft 2 is selected (e.g., photographing, placing transported object, pressing a button).

The flight plan creation unit 15 is configured to determine a task location of the unmanned aircraft 2 based on the identification information on the machine 4 and the task description acquired by the task description acquisition unit 14, so as to create a flight plan for conducting a task in the determined task location.

The task location of each machine 4 shall be set in advance as three-dimensional coordinates. A three-dimensional map storage unit 19 is configured to store a three-dimensional map of a factory including task locations. The flight plan creation unit 15 associates the environmental map of the unmanned aircraft 2 with a three-dimensional map based on such as characteristic points, maps the self-location of the unmanned aircraft 2 onto a coordinate system of the three-dimensional map, and creates a flight plan of the unmanned aircraft 2 based on the self-location and the task locations of the unmanned aircraft 2 on the three-dimensional map.

As a task description of the unmanned aircraft 2, in a case of selecting only one task, the flight plan creation unit 15 creates a flight route to a task location of the selected machine 4. In a case of setting multiple task descriptions, the flight plan creation unit 15 creates a route for continuously conducting tasks based on a battery level of the unmanned aircraft 2 and multiple task locations, by way of example.

The unmanned aircraft 2 makes autonomous flight according to the flight plan created by the flight plan creation unit 15. The flight plan creation unit 15 monitors the self-location and the environmental map of the unmanned aircraft 2 and tracks the location of the unmanned aircraft 2, thereby updating the flight plan as appropriate.

The flight plan output unit 16 is configured to output the flight plan to the unmanned aircraft 2 via the radio communication device 3. The flight plan may be stored in the non-volatile memory 214 of the unmanned aircraft 2. The flight plan may include a start time of the flight.

As the flight plan that includes the start time of the flight of the unmanned aircraft 2, there are a scheduled flight plan and an unscheduled flight plan. The scheduled flight plan is for performing periodic inspections on the machines 4. The scheduled flight plan may be stored in advance in the non-volatile memory 214 of the unmanned aircraft 2, so as to start a task automatically at a predefined time. Automatic periodic inspections prevent inspection omissions, thereby reducing the burden on the user. Furthermore, the frequency of the inspections can be increased to detect problems early.

A task result acquisition unit 17 is configured to acquire a task result made by the unmanned aircraft 2. A task result includes images obtained from the task result, such as images taken by the camera 217 of the unmanned aircraft 2, success and failure of physical tasks (transportation, button press, etc.) conducted by the unmanned aircraft and so on.

Figure 6:
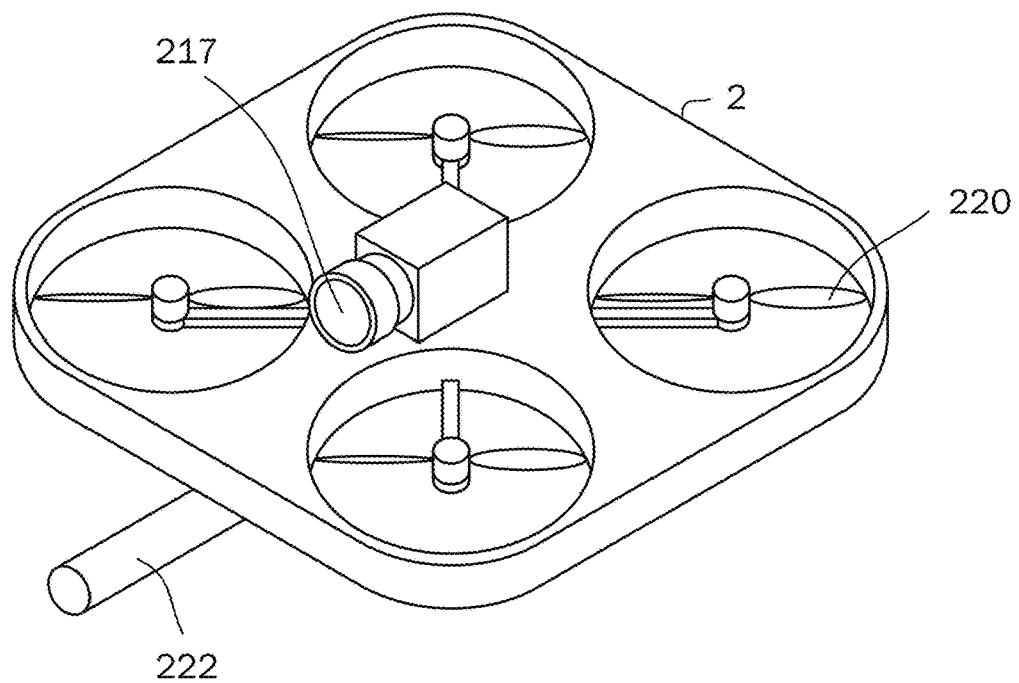
FIG. 6 shows an example of an unmanned aircraft having a function of pressing a button.

FIG. 6 shows an unmanned aircraft 2 that has a function of pressing a button. When the unmanned aircraft 2 presses a button on the machine 4, a location of the unmanned aircraft 2 is adjusted based on camera images, and then a selected button is pressed by means of a pointer 222. After confirming the button press by the camera 217, the unmanned aircraft 2 outputs the success of the task to the PC 1.

Figure 7:
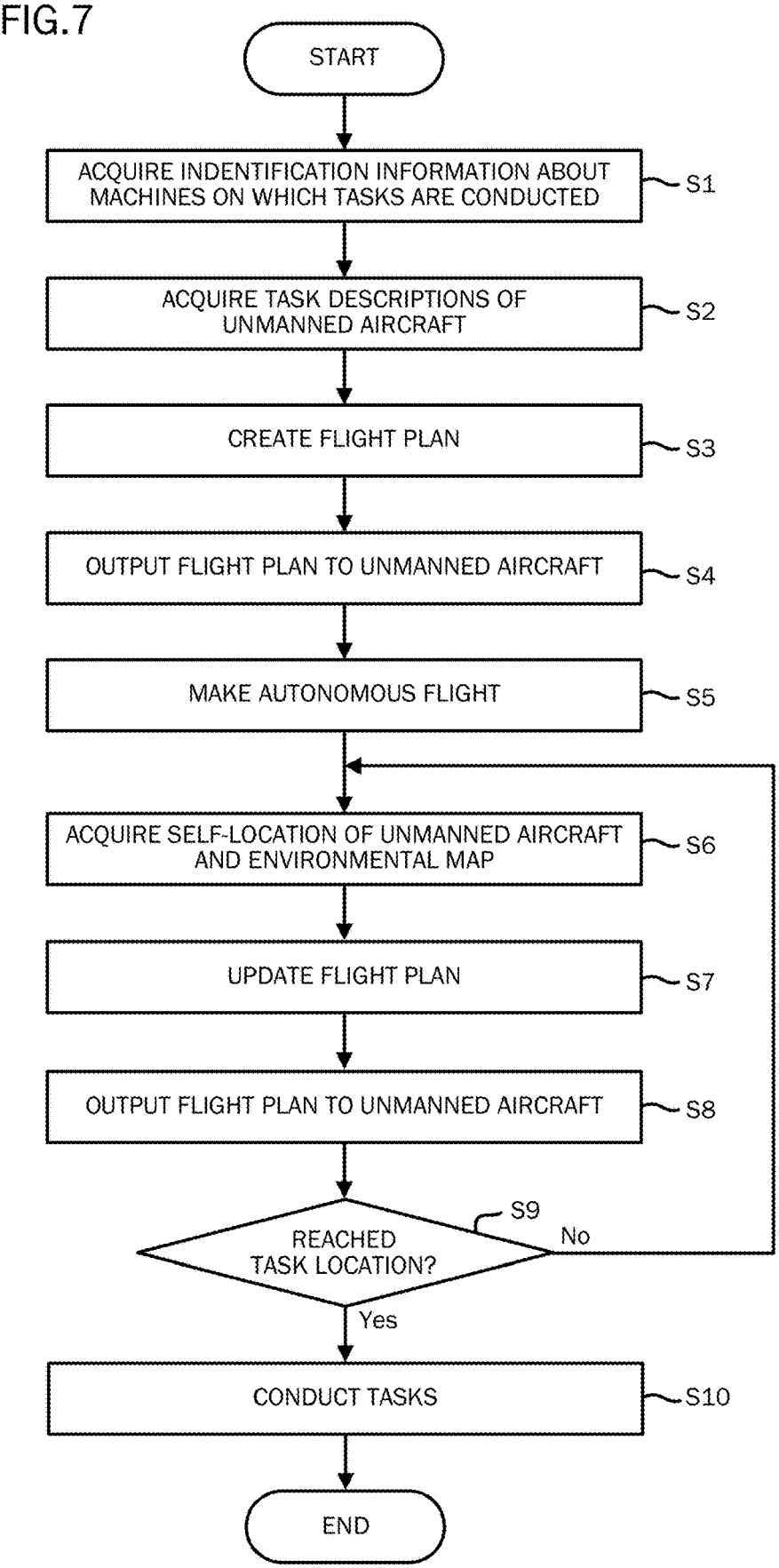
FIG. 7 is a flowchart illustrating a method for controlling an unmanned aircraft according to the first disclosure.

A method for controlling an unmanned aircraft performed by the PC 1 will be described with reference to a flowchart shown in FIG. 7.

The PC 1 reads a list of machines 4 selectable as task objects from the available task storage unit 13 and presents the list to a user, and acquires an identification number/numbers (identification information) of a machine/machines 4 selected by the user (Step S1). The PC 1 then presents a list showing task descriptions which can be conducted on the selected machine/machines 4 by the unmanned aircraft 2, so as to acquire task descriptions to be conducted by the unmanned aircraft 2 (Step S2).

The flight plan creation unit 15 creates a flight plan based on a task location of a machine 4 that is a task object (Step S3). The flight plan output unit 16 outputs the flight plan to the unmanned aircraft 2 through the radio communication device 3 (Step S4). The unmanned aircraft 2 makes autonomous flight according to the flight plan (Step S5), so as to determine a self-location and an environmental map. The self-location acquisition unit 11 of the PC 1 acquires the self-location of the unmanned aircraft 2, and the environmental map acquisition unit 12 acquires the environmental map (Step S6). The flight plan creation unit 15 maps the self-location and the environmental map of the unmanned aircraft 2 on a three-dimensional map to update the flight plan (Step S7). The flight plan output unit 16 outputs the updated flight plan to the unmanned aircraft 2 (Step S8).

When the unmanned aircraft 2 reaches the task location (Step S9: Yes), the unmanned aircraft 2 conducts the task acquired in Step S2 (Step S10). The processes in Step S6 to Step S9 are repeated until the unmanned aircraft 2 reaches the task location (Step S9: No).

As described above, the unmanned aircraft control system 100 according to the first disclosure allows the user to select the machines 4 which are the task objects and the task description for each machine 4. Then, the unmanned aircraft control system 100 causes the unmanned aircraft 2 to conduct the tasks selected by the user on the machines 4 selected by the user.

Figure 8:
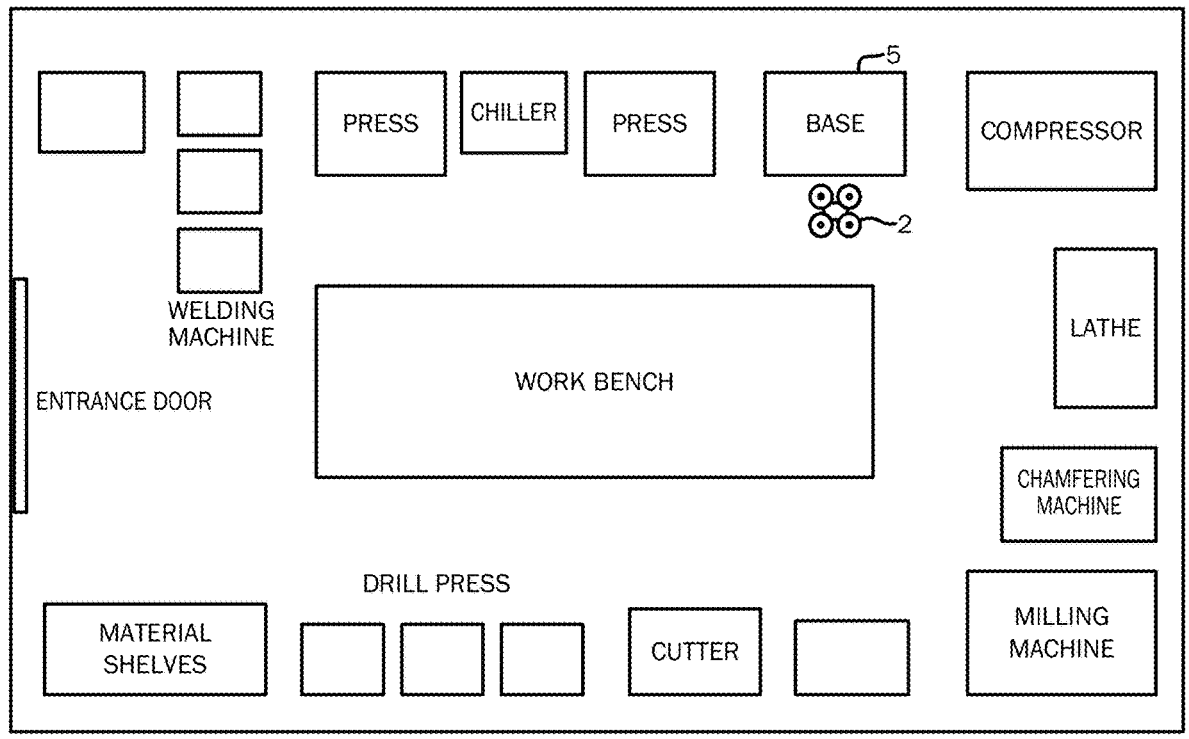
FIG. 8 shows an example of a factory layout.

The machines 4 have different shapes and functions according to their types and the makers. For example, a machine tool and a robot which are machines installed in a factory have shapes different from each other, and thus task descriptions and task locations are different from one another. FIG. 8 shows an example of a layout of a factory, in which various machines are installed, such as press machine, chiller, compressor, lathe, chamfering machine, milling machine, cutter, drill press and welding machine. In addition to that, the factory also has various equipment, such as air-conditioning equipment, ventilating equipment, fire and smoke exhaust equipment, inspection equipment, piping equipment, and clean room. In these pieces of equipment, the locations of alarm lamps and operation screens are also different from one another.

There are many machines 4 installed in the factory, and it is necessary to conduct various tasks on the machines 4. The available task storage unit 13 of the PC 1 of the unmanned aircraft control system 100 according to the present disclosure stores a task location and a task description of the unmanned aircraft 2 for each machine 4. The user of the unmanned aircraft control system 100 can easily provide task instructions to the unmanned aircraft 2 by simply selecting the machines 4 and the task descriptions without regard to the structures of the machines.

In a case where no required tasks are registered, the user can set the task locations and the task descriptions on his/her own accord. The use of a three-dimensional map facilitates setting the task locations of the unmanned aircraft 2.

Second Disclosure

Figure 9:
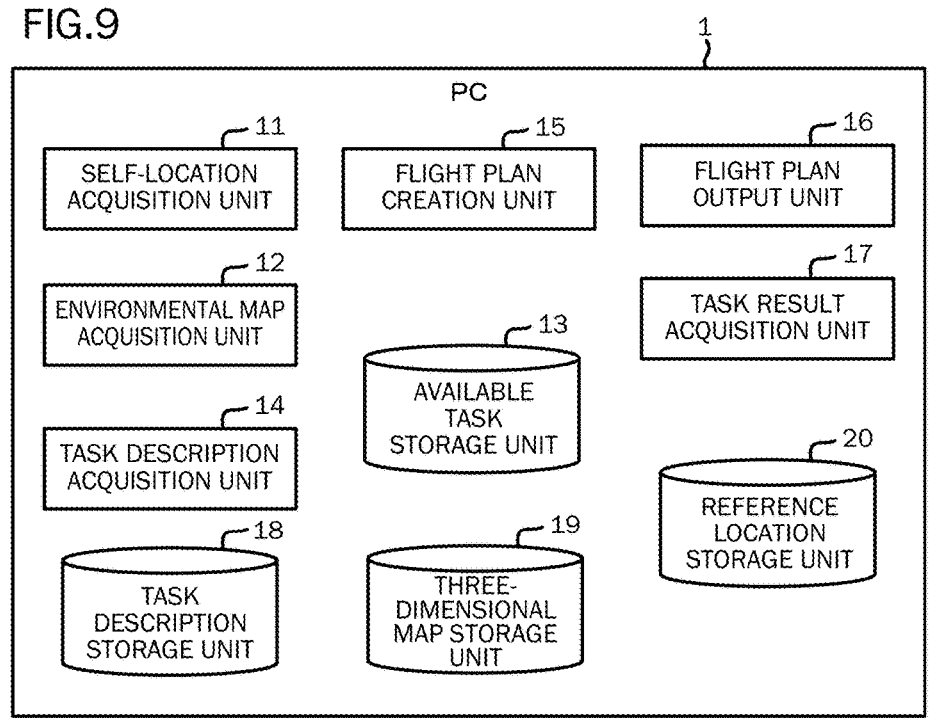
FIG. 9 is a block diagram of a PC according to a second disclosure.

The PC 1 according to a second disclosure includes a reference location storage unit 20 as shown in FIG. 9, and the flight plan creation unit 15 creates a flight plan to pass a reference location.

The reference location storage unit 20 is configured to store the reference location. The reference location is a base point of a task location set for each machine 4. If the layout of the machines 4 in a factory is known, the reference location of each machine 4 can be determined, and thus the task location of the machine can be determined.

The reference location storage unit 20 also stores a flight route from the reference location to the task location and a task description to be conducted at the task location (e.g., photographing, placing a transported object, pressing a button), for instance. Information about the reference location of each machine 4, the task location based on the reference location and the task description may be prepared in advance by the manufacturer of each machine 4 and provided as an option when the machine is sold. If there is no desired task description, the user can create a new task description. When a task description is created, a three-dimensional map and CAD (Computer Aided Design) are used to specify a task location, and a task description that can be conducted by the unmanned aircraft is selected (e.g., photographing, placing a transported object, pressing a button).

The flight plan creation unit 15 creates a flight plan based on the task descriptions acquired by the task description acquisition unit 14 and the reference locations stored in the reference location storage unit 20. The reference locations can be determined based on the layout of the machines 4 in a three-dimensional map. The task locations can be determined based on the reference locations. The user can easily provide task instructions to the unmanned aircraft 2 by simply selecting the machines 4 and the task descriptions without regard to the structures of the machines 4.

Figure 10:
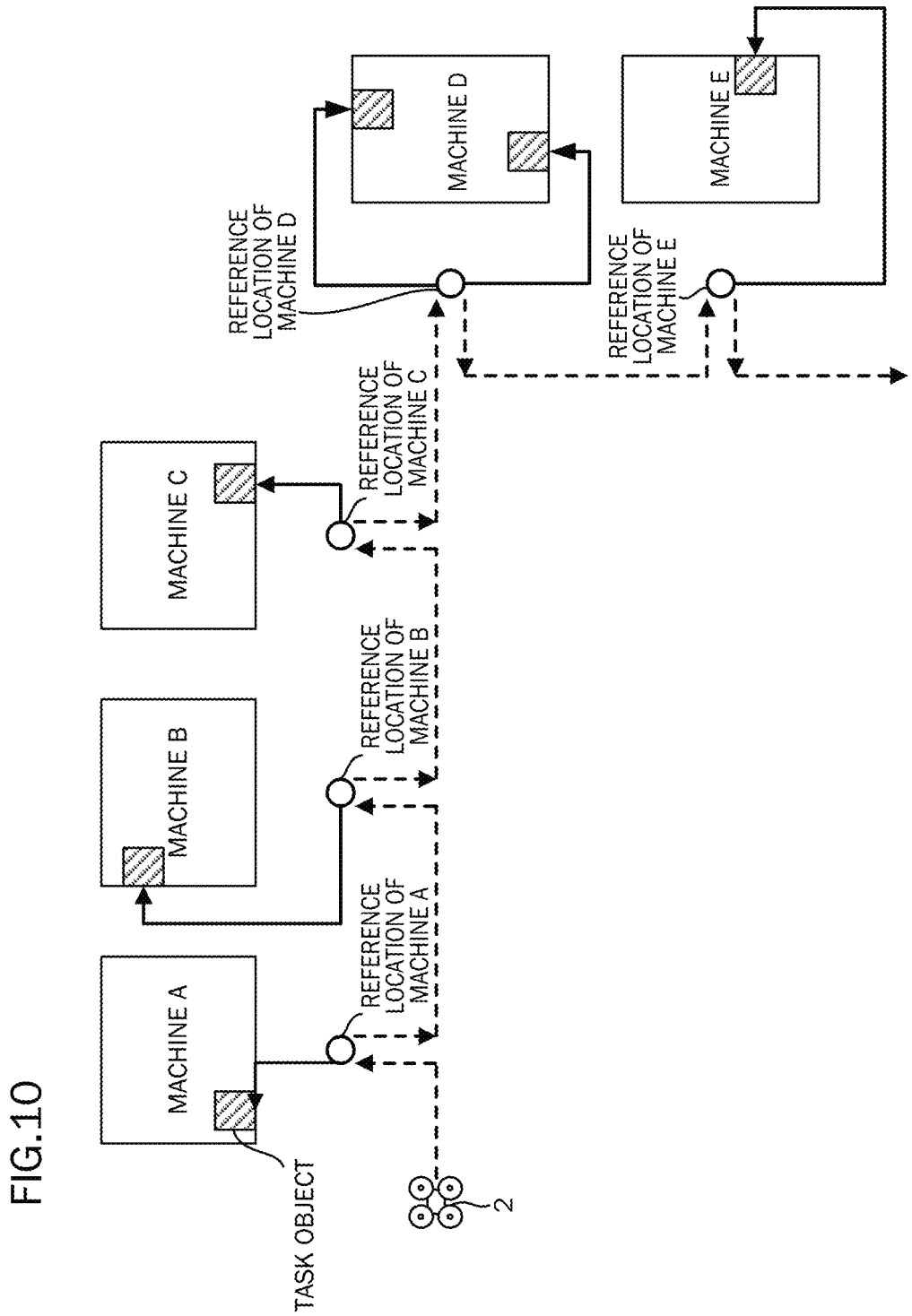
FIG. 10 shows an example of a route of an unmanned aircraft that passes reference points to perform tasks.

In creating a flight route by utilizing the reference locations, the unmanned aircraft 2 flies to pass the reference locations of the machines 4, namely a machine A, a machine B, a machine C, a machine D and a machine E, as shown in FIG. 10 with dashed arrows. The flight route from the reference locations of the machines 4 to task objects are set in advance as indicated by solid arrows.

Unlike a case of an ordinary warehouse, the machines 4 installed in the factory have complicated structures, and thus their operations vary. It is therefore necessary to create a task description for each machine 4. The reference location storage unit 20 stores a relative location of the task location to the reference location and the task description for each machine 4.

Figure 11:
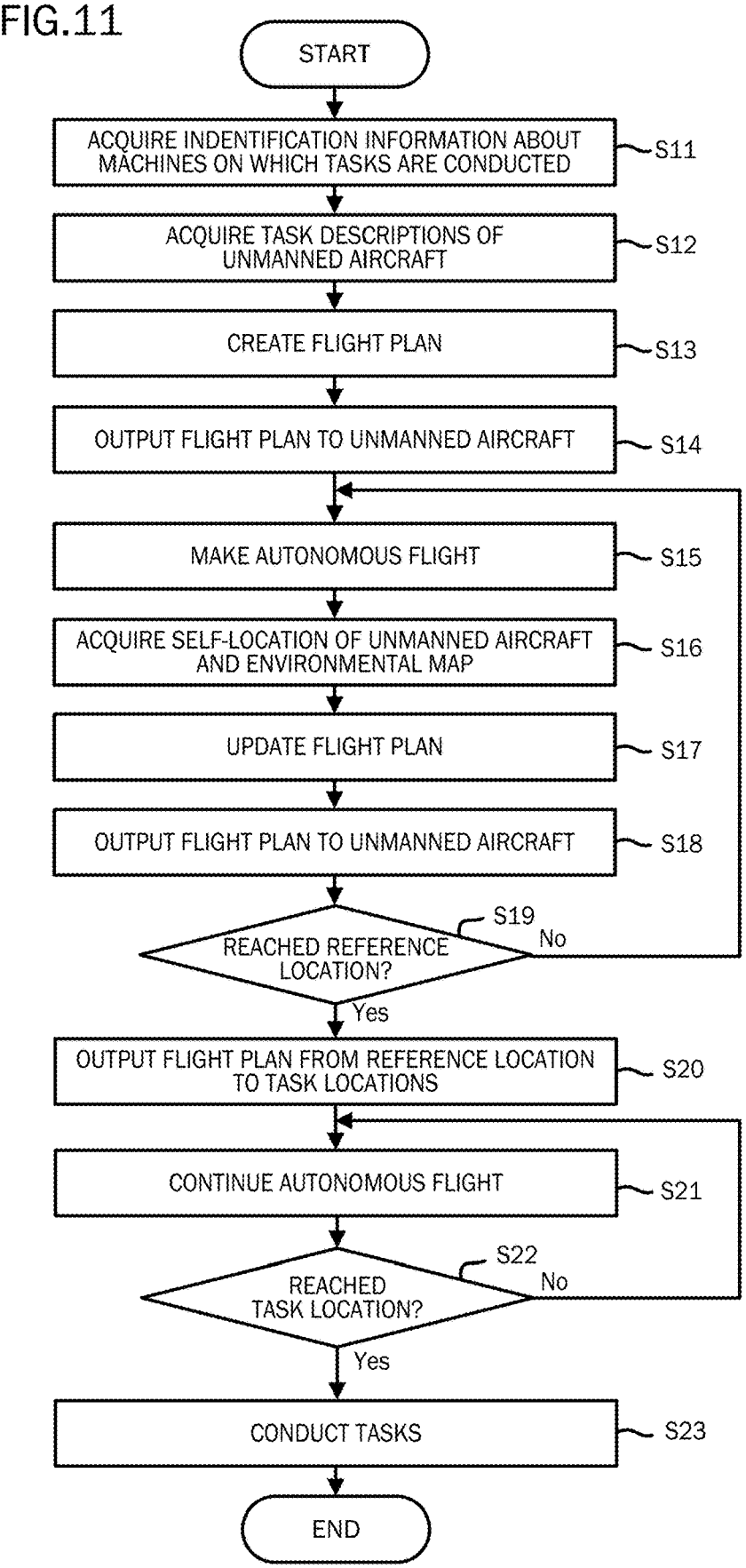
FIG. 11 is a flowchart illustrating a method for controlling an unmanned aircraft according to the second disclosure.

By referring to a flowchart of FIG. 11, a method for controlling the unmanned aircraft by the PC 1 will be described.

The PC 1 reads a list of the machines 4 selectable as task objects from the available task storage unit 13, and presents the list to the user, so as to acquire identification information of the machines 4 selected by the user (Step S11). The PC 1 displays a list of task descriptions which can be conducted on the selected machines 4 by the unmanned aircraft 2, so as to acquire the task descriptions of the unmanned aircraft 2 (Step S12).

The flight plan creation unit 15 creates a flight plan based on the task locations of the machines 4 which are task objects (Step S13). The flight plan output unit 16 outputs the flight plan of the unmanned aircraft 2 via the radio communication device 3 (Step S14). The unmanned aircraft 2 makes autonomous flight according to the flight plan (Step S15), so as to determine a self-location and an environmental map. The self-location acquisition unit 11 of the PC 1 acquires the self-location of the unmanned aircraft 2, and the environmental map acquisition unit 12 acquires the environmental map (Step S16). The flight plan creation unit 15 maps the self-location of the unmanned aircraft 2 and the environmental map on a three-dimensional map to update the flight plan (Step S17). The flight plan output unit 16 outputs the updated flight plan to the unmanned aircraft 2 (Step S18).

When the unmanned aircraft 2 reaches the reference location of a machine 4 (Step S19: Yes), the flight plan creation unit 15 outputs the flight route from the reference location to the task location stored in the reference location storage unit 20 to the unmanned aircraft 2 (Step S20). The processes in Step S15 to Step S19 are repeated until the unmanned aircraft 2 reaches the task location (Step S19: No).

The unmanned aircraft 2 continues the autonomous flight (Step S21) to move from the reference location to the task location. Once the unmanned aircraft 2 reaches the task location from the reference location (Step S22: Yes), the unmanned aircraft 2 conducts the task acquired in Step S12 (Step S23). The unmanned aircraft 2 continues the autonomous flight in Step S21 until it reaches the task location (Step S22: No).

The unmanned aircraft control system 100 according to the second disclosure manages the reference location, the task location and the task description for each machine 4. The manufacturer of each machine 4 can distribute a reference location, a task location and a task description of the unmanned aircraft 2 with respect to the manufacturer's machine 4 as an option to a user.

The user can add task descriptions as needed basis. The task descriptions of the unmanned aircraft 2 can be recorded in a cloud storage or others, thereby allowing other users to utilize the recorded task descriptions.

Furthermore, the task location based on the reference location for each machine 4 can be used to carry over the set task description as is even if the layout of the factory is changed.

Third Disclosure

According to a third disclosure, the identification of the machines 4 is performed by using an image processing result instead of using coordinate values as in a three-dimensional map. The image processing unit 216 of the unmanned aircraft 2 in the third disclosure is an advanced image processing unit such as an AI (artificial intelligence) image processing chip, for example, that can store a characteristic point of a machine 4 as a task object to identify the machines 4 based on images taken by the camera 217, point group data of a radar and others. In addition to that, the image processing unit 216 may send the images taken by the unmanned aircraft 2 and the point group data of the radar to the PC 1, so that the image processing unit, not shown, of the PC 1 can identify the machines 4 located around the unmanned aircraft 2.

The flight plan creation unit 15 reads the task locations of the machines 4 identified by the image processing unit 216 and the task descriptions in the task description storage unit 18 to create a flight plan.

In the unmanned aircraft control system 100 according to the third disclosure, the unmanned aircraft 2 identifies the machines 4, and when there is a machine 4 that is a task object around the aircraft, conducts the task on it.

Figure 12:
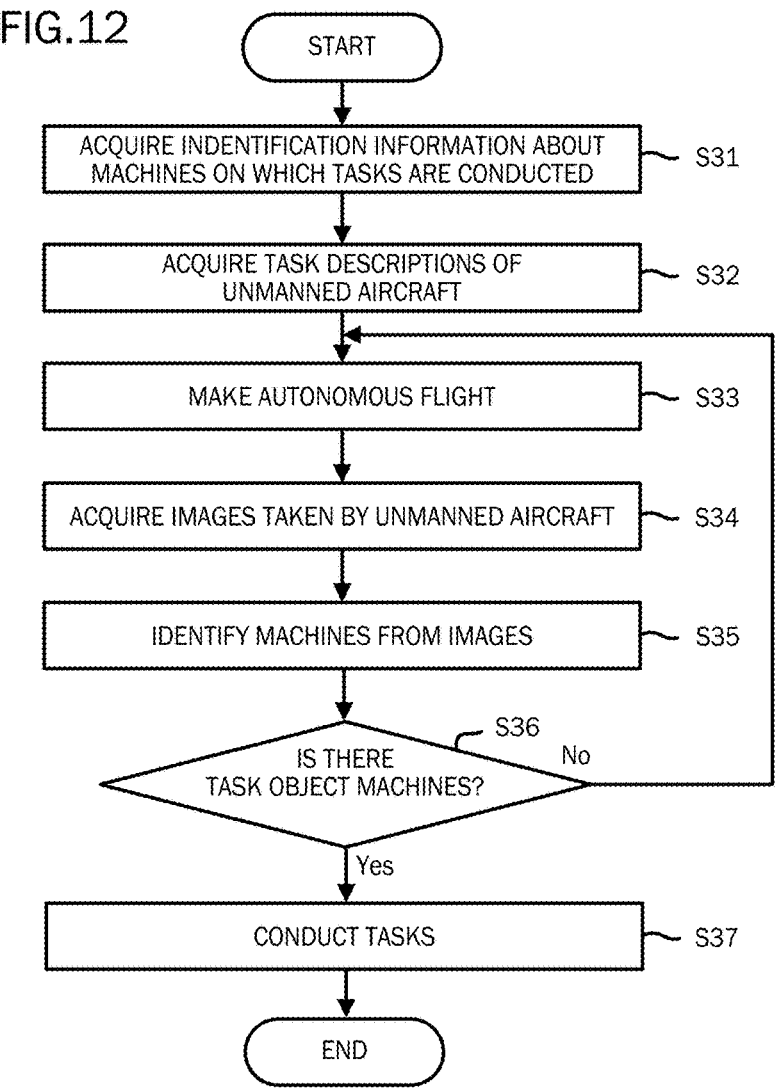
FIG. 12 is a flowchart illustrating a method for controlling an unmanned aircraft according to a third disclosure.

A method for controlling the unmanned aircraft according to the third disclosure will be described by referring to a flowchart shown in FIG. 12. In an example shown in FIG. 12, the identification of the machines 4 is performed by using images taken by the camera 217. Alternatively, identification means other than the camera 217 may be employed.

The PC 1 reads a list of the machines 4 selectable as task objects from the available task storage unit 13, and presents the list to a user to acquire identification information about the machines 4 selected by the user (Step S31). The PC then displays a list of task descriptions which can be conducted on the selected machines 4 by the unmanned aircraft 2, so as to acquire the task descriptions of the unmanned aircraft 2 (Step S32).

The unmanned aircraft 2 makes autonomous flight (Step S33). The unmanned aircraft 2 acquires images taken by the camera 217 (Step S34). The image processing unit 216 identifies the machines 4 by applying a technique such as image identification (Step S35). If the unmanned aircraft 2 identifies the machine 4 selected as a task object in Step S31 (Step S36: Yes), a task description is read from the task description storage unit 18 so that the unmanned aircraft 2 implements the task selected in Step S32 (Step S37).

If there is no machine 4 as a task object around the unmanned aircraft 2 (Step S36: No), the procedure returns to Step S33.

As described above, the third disclosure uses sensor data such as images to identify the machines 4 and implement the task appropriate to each machine 4. In the third disclosure, the tasks can be implemented without the location information of the machines 4, such as a three-dimensional map.

Fourth Disclosure

Figure 13:
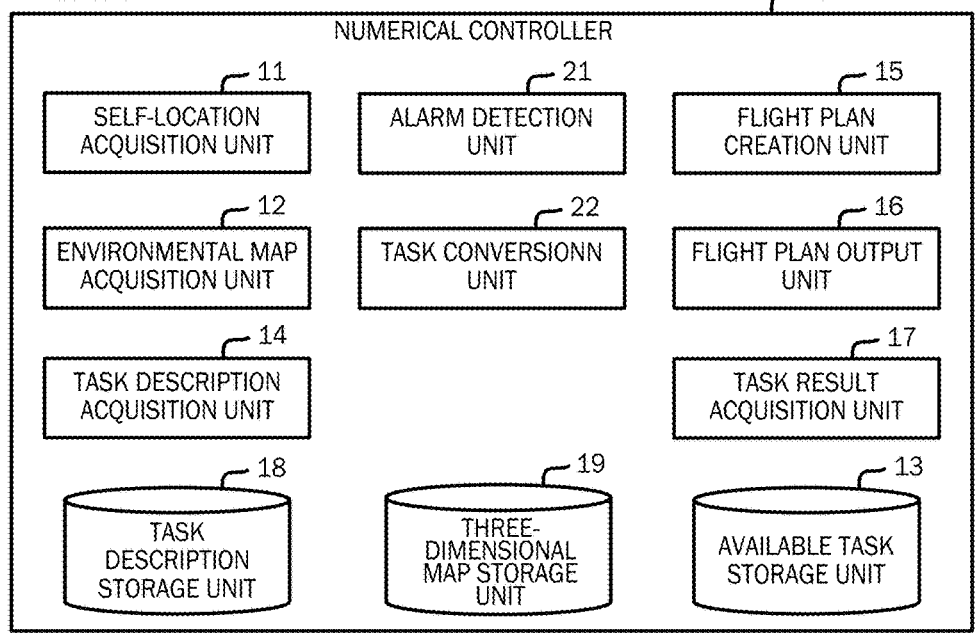
FIG. 13 is a block diagram of a numerical controller according to a fourth disclosure.

The unmanned aircraft 2 according to a fourth disclosure starts a task with an alarm as a trigger. The fourth disclosure adopts a numerical controller 6 as an unmanned aircraft controller instead of the PC 1. The numerical controller 6 is for controlling a machine 4, such as an industrial machine. The numerical controller 6 includes a processor, as with the PC 1, that executes a program to control the machine 4. As shown in FIG. 13, the numerical controller 6 in the fourth disclosure includes an alarm detection unit 21 and a task conversion unit 22. The numerical controller 6 connects with a programmable logic controller (PLC) or similar that performs sequence control on a machine tool to be controlled and other machines.

The alarm detection unit 21 is configured to detect an alarm issued by a sensor or other machines, the sensor being connected to the numerical controller 6, the machine tool or the PLC. The numerical controller 6 and the PLC are connected to the sensor or equivalent to detect an abnormal event occurring in a factory.

Figure 14:
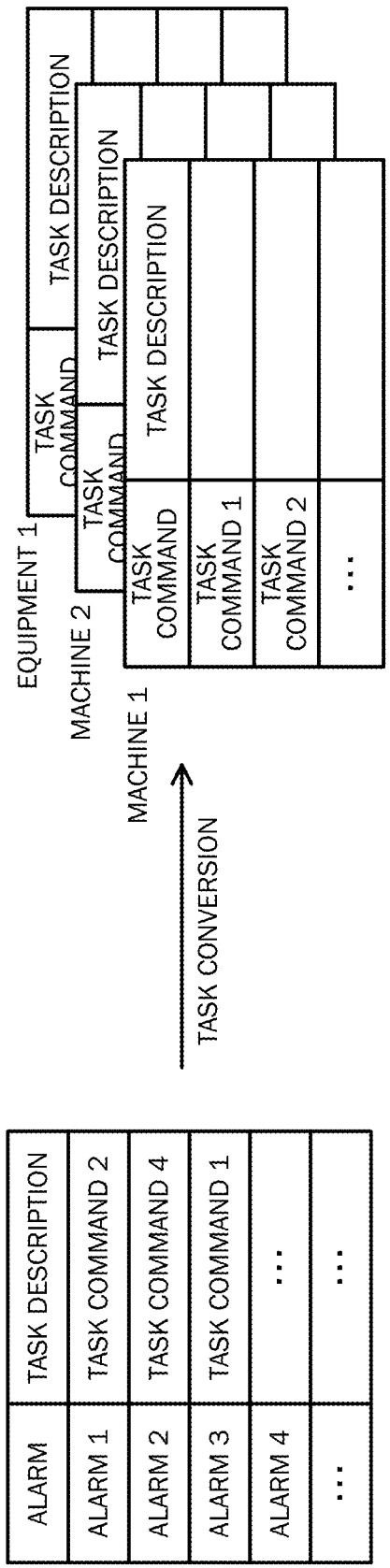
FIG. 14 illustrates processes carried out by a task conversion unit.

The task conversion unit 22 is configured to convert a task to be conducted by the unmanned aircraft 2 into a task set for each machine 4 when an alarm is issued. In the task conversion unit 22, information is set as to what kind of task is to be conducted on which machine 4 when each alarm is issued. In an example shown in FIG. 14, "task command 2" is conducted when "alarm 1" is issued. Each task command is associated with each machine 4, so that it is possible to determine which task should be conducted on which machine 4 to implement "task command 2".

For example, when an alarm issued due to heat generation in a machine 4, a determination can be made about the identification information of a machine 4 that is a task object when the alarm is issued and a task description to be conducted on the machine 4 by the unmanned aircraft 2 (e.g., photographing of the place of the heat generation and checking a heat source using an infrared sensor). As to factories, equipment having a long service life, such as air conditioning equipment, power-supply equipment or water supply and sewerage systems, is often not digitized. In a case where an alarm about temperature, humidity, voltage or others in a factory is detected, the location of an analog type meter of a concerned machine is read to photograph the analog type meter.

Figure 15:
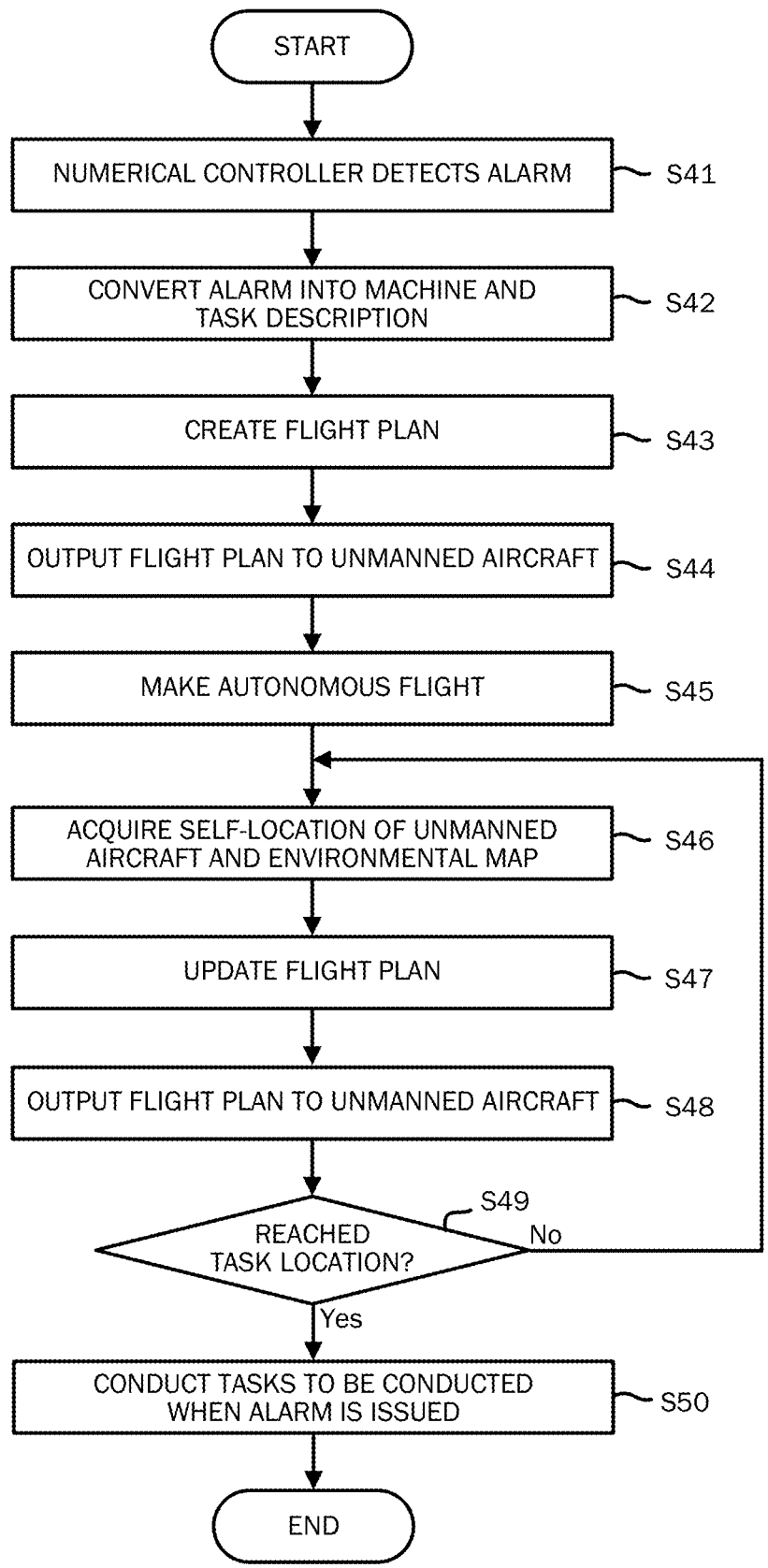
FIG. 15 is a flowchart illustrating a method for controlling an unmanned aircraft according to the fourth disclosure.

By referring to a flowchart shown in FIG. 15, a description will be made about the unmanned aircraft control system 100 according to the fourth disclosure. The numerical controller 6 detects an alarm (Step S41). The numerical controller 6 then converts a task to be conducted by an unmanned aircraft 2 when an alarm is issued into a task description for each machine 4 (Step S42). A flight plan creation unit 15 creates a flight plan based on the information about the machine 4 which is a task object and the task description (Step S43). A flight plan output unit 16 outputs a flight plan to the unmanned aircraft 2 through the radio communication device 3 (Step S44). The unmanned aircraft 2 makes autonomous flight according to the flight plan (Step S45), so as to determine its self-location and an environmental map. A self-location acquisition unit 11 of the numerical controller 6 acquires the self-location of the unmanned aircraft, and an environmental map acquisition unit 12 acquires the environmental map (Step S46). The flight plan creation unit 15 maps the self-location of the unmanned aircraft 2 and the environmental map on a three-dimensional map of the factory to thereby update the flight plan (Step S47). The flight plan output unit 16 outputs the updated flight plan to the unmanned aircraft 2 (Step S48).

When the unmanned aircraft 2 reaches the task location of the machine 4 as the task object (Step S49: Yes), the unmanned aircraft 2 conducts a task that should be implemented when the alarm is issued (Step S50). The processes in Steps S46 to S49 are repeated until the unmanned aircraft 2 reaches the task location.

In the unmanned aircraft control system 100 in the fourth disclosure, with an alarm detected by the numerical controller 6 or the PLC as a trigger, the unmanned aircraft 2 automatically conducts a task associated with the alarm. The unmanned aircraft 2 confirms a place where the alarm was issued, so as to be able to respond to the alarm quickly. Furthermore, it is not necessary to check many sites and instruments by humans at once, thereby reducing the burden on a user.

Furthermore, the processes of detecting an alarm and creating a flight plan, sending the flight plan to the unmanned aircraft 2 and so on may be divided among multiple information processors (e.g., PC, numerical controller, PLC, server, mobile terminal). For example, the processes can be divided in such a way that the PC 1 registers tasks of the unmanned aircraft 2 and creates a flight plan, the numerical controller 6 detects an alarm, and the PLC sends out the flight plan.

Fifth Disclosure

Figure 16:
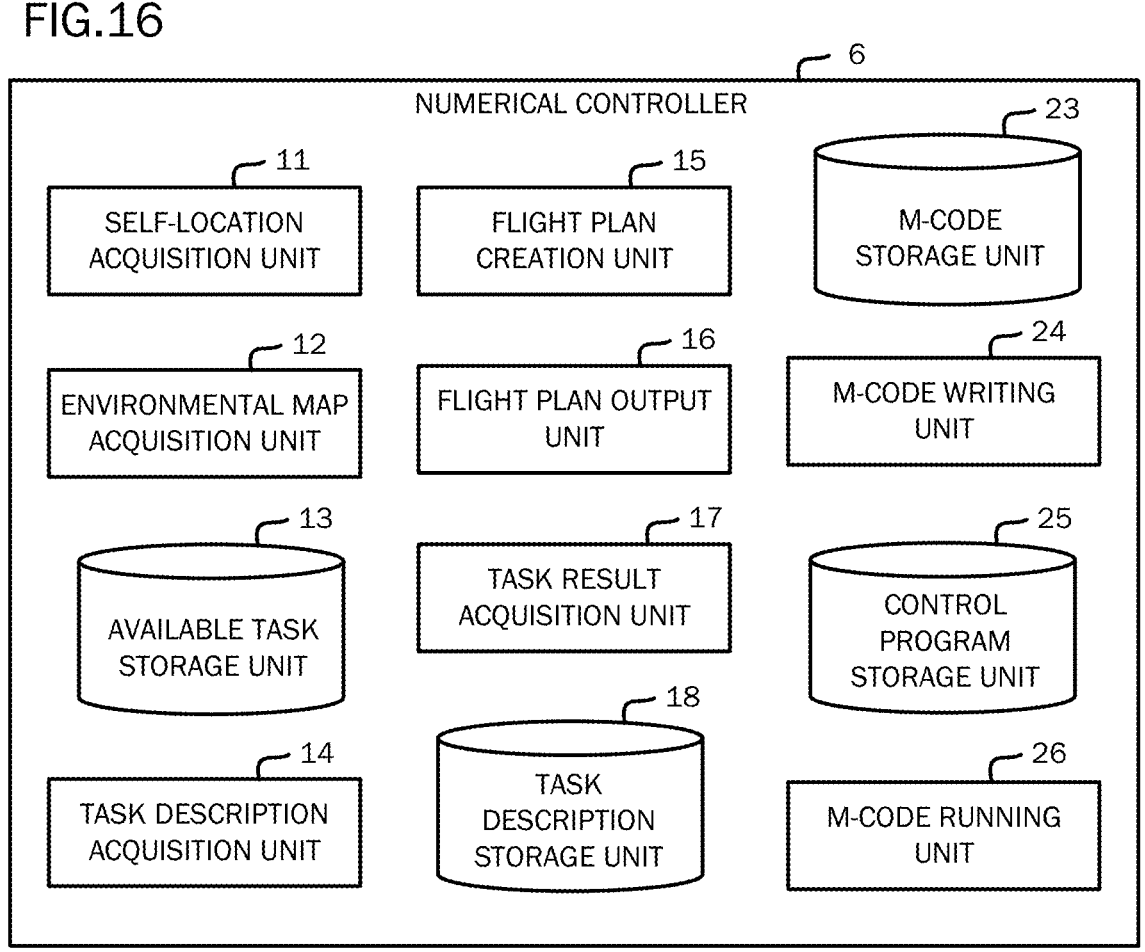
FIG. 16 is a block diagram of a numerical controller according to a fifth disclosure.

In a fifth disclosure, the numerical controller 6 uses a control program to control the unmanned aircraft 2. As shown in FIG. 16, the numerical controller 6 of the unmanned aircraft control system 100 in the fifth disclosure includes an M-code storage unit 23, an M-code writing unit 24, a control program storage unit 25 that stores a control program that includes M-codes, and an M-code running unit 26 that runs the M-codes written in the control program.

The task description acquisition unit 14 of the numerical controller 6 acquires the information about machines 4 which are task objects and task descriptions to be conducted by the unmanned aircraft 2.

The M-code storage unit 23 is configured to store M-codes. The M-codes are associated with task descriptions stored in the available task storage unit 13, which can be conducted by the unmanned aircraft 2.

M-code is also referred to as auxiliary function code that can be written into a control program of the numerical controller 6. The numerical controller 6 controls the unmanned aircraft 2 with the M-codes written in the control program as a trigger. M-code includes "Program Stop (Pause): M00", "Optional Stop: M01", "Program End: M02, M30", "Tool Change: M06" and "Pallet Change: M60", by way of example. In addition to the existing M-codes, a user can create a new code. Thus, the user can create a necessary code on his/her own accord. The M-code thus created may be stored in the M-code storage unit 23.

The M-code writing unit 24 is configured to read an M-code associated with the task description acquired by the task description acquisition unit 14 from the M-code storage unit 23 to write the M-code into a control program of the numerical controller 6.

The control program storage unit 25 is configured to store a control program. This control program includes one in which M-codes for controlling the unmanned aircraft 2 are written and one in which such codes are not written.

The M-code running unit 26 is configured to output a command to the PLC or the unmanned aircraft 2 to control the unmanned aircraft 2 if a result of an analysis of the control program shows the presence of an M-code for controlling the unmanned aircraft 2. The M-code triggers the control of the unmanned aircraft 2.

The M-code storage unit 23 and the M-code writing unit 24 in the fifth embodiment may be incorporated in another device such as the PC 1, so that the control program with the M-codes written therein can be acquired from an external device. The self-location acquisition unit 11, the environmental map acquisition unit 12, the available task storage unit 13, the task description acquisition unit 14, the flight plan creation unit 15, the flight plan output unit 16, the task result acquisition unit 17 and the task description storage unit 18 may be divided among one or more information processors (e.g., PC, numerical controller, PLC, server, mobile terminal).

The invention claimed is:
1. An unmanned aircraft controller for an unmanned aircraft operated in a factory, the unmanned aircraft controller comprising:
   an available task storage memory storing identification information about machines installed in the factory and task descriptions of tasks the unmanned aircraft is configured to conduct on the machines; and
at least one processor configured to:
acquire the identification information about the machines which are objects of the tasks to be conducted by the unmanned aircraft and the task descriptions of the tasks to be conducted on the machines by the unmanned aircraft;
create a flight plan of the unmanned aircraft based on the acquired identification information about the machines and the task descriptions of the tasks to be conducted on the machines by the unmanned aircraft; and
output the flight plan to the unmanned aircraft, wherein
the available task storage memory further stores a reference location of each machine of the machines, a task location of the unmanned aircraft, and a task description of a task to be conducted at the task location by the unmanned aircraft,
the task location is a location of the unmanned aircraft relative to the reference location of said each machine, and
the at least one processor is configured to
create the flight plan based on the acquired identification information about the machines, the task descriptions of the tasks to be conducted on the machines by the unmanned aircraft, and the reference locations of the machines, and
control the unmanned aircraft to make autonomous flight according to the flight plan and conduct the tasks on the machines according to the task descriptions.

2. The unmanned aircraft controller according to claim 1, wherein
the at least one processor is configured to:
present the machines and the task descriptions of the tasks to be which can be conducted on the machines by the unmanned aircraft to a user, and
receive a result of selection of (i) one or more machines which are objects of tasks to be conducted by the unmanned aircraft and (ii) the task descriptions of the tasks to be conducted by the unmanned aircraft.

3. The unmanned aircraft controller according to claim 1, wherein
the at least one processor is configured to:
detect an alarm; and
convert a task to respond to the alarm into a task description of a task for each machine to be conducted on said each machine by the unmanned aircraft, and
the at least one processor is configured to acquire the identification information about said each machine by the unmanned aircraft and the task descriptions of the tasks to be conducted by the unmanned aircraft.

4. The unmanned aircraft controller according to claim 1, wherein
the at least one processor is configured to
set multiple task descriptions of the tasks to be conducted by the unmanned aircraft, and
in response to the multiple task descriptions being set, create a route to conduct the tasks successively based on the reference locations of multiple machines of the machines which are objects of the multiple task descriptions.

5. The unmanned aircraft controller according to claim 1, wherein the unmanned aircraft controller is a numerical controller comprising:
the at least one processor, and
an auxiliary code storage memory storing auxiliary codes of a control program, the auxiliary codes being associated with the task descriptions stored in the available task storage memory; and
the at least one processor is configured to read the auxiliary codes from the auxiliary code storage memory to create a control program that includes the auxiliary codes based on the acquired task descriptions.

6. A non-transitory computer readable storage-medium that stores computer-readable commands, for causing at least one processor to execute:
storing identification information about machines installed in a factory and task descriptions of tasks an unmanned aircraft is configured to conduct on the machines,
acquiring the identification information about the machines which are objects of tasks to be conducted by the unmanned aircraft and the task descriptions of the tasks to be conducted on the machines by the unmanned aircraft;
creating a flight plan of the unmanned aircraft based on the acquired identification information about the machines and the task descriptions of the tasks to be conducted on the machines by the unmanned aircraft; and
outputting the flight plan to the unmanned aircraft, wherein
the computer-readable commands are configured to cause the at least one processor to execute:
storing a reference location of each machine of the machines, a task location of the unmanned aircraft, and a task description of a task to be conducted at the task location by the unmanned aircraft, wherein the task location is a location of the unmanned aircraft relative to the reference location of said each machine,
creating the flight plan based on the acquired identification information about the machines, the task descriptions of the tasks to be conducted on the machines by the unmanned aircraft, and the reference locations of the machines, and
controlling the unmanned aircraft to make autonomous flight according to the flight plan and conduct the tasks on the machines according to the task descriptions.

7. The non-transitory computer readable medium according to claim 6, wherein
the computer-readable commands are configured to cause the at least one processor to execute:
presenting the machines and the task descriptions of the tasks to be conducted on the machines by the unmanned aircraft to a user, and
receiving a result of selection of (i) one or more machines which are objects of tasks to be conducted by the unmanned aircraft and (ii) the task descriptions of the tasks to be conducted by the unmanned aircraft.

8. The non-transitory computer readable medium according to claim 6, wherein
the computer-readable commands are configured to cause the at least one processor to execute:
detecting an alarm, and converting a task to respond to the alarm into a task description of a task to be conducted on said each machine by the unmanned aircraft.

9. The non-transitory computer readable medium according to claim 6, wherein
the computer-readable commands are configured to cause the at least one processor to execute,
setting multiple task descriptions of the tasks to be conducted by the unmanned aircraft, and
in response to the multiple task descriptions being set, creating a route to successively conduct the tasks based on reference locations of multiple machines of the machines which are objects of the multiple task descriptions.

10. The non-transitory computer readable medium according to claim 6, wherein
the computer-readable commands are configured to cause the at least one processor to execute
storing auxiliary codes of a control program of a numerical controller, the auxiliary codes being associated with the task descriptions of the tasks the unmanned aircraft is configured to conduct on the machines, and
when the unmanned aircraft acquires the task descriptions of the tasks to be conducted on the machines, reading the auxiliary codes associated with the task descriptions to create a control program that includes the auxiliary codes.

11. The unmanned aircraft controller according to claim 1, wherein
the at least one processor is configured to control the unmanned aircraft to fly to the task locations of the unmanned aircraft.

12. The non-transitory computer readable medium according to claim 6, wherein
the computer-readable commands are configured to cause the at least one processor to execute controlling the unmanned aircraft to fly to the task locations of the unmanned aircraft.

\* \* \* \* \*